US005868352A

United States Patent [19]

Tsukimori

[11] Patent Number: 5,868,352

[45] Date of Patent: Feb. 9, 1999

[54] STRAIGHT GROUND-RUN MECHANISM OF TAIL WHEEL-TYPE AIRPLANE

[76] Inventor: Yukio Tsukimori, 288-1 Imaichi-cho, Izumo-shi Shimane 693, Japan

[21] Appl. No.: 690,753

[22] Filed: Aug. 1, 1996

[30] Foreign Application Priority Data

Aug. 17, 1995 [JP] Japan ................................ 7-245058

[51] Int. Cl.[6] ................................ B64C 25/26

[52] U.S. Cl. ................................ 244/50; 244/100 R

[58] Field of Search ................................ 244/50, 235, 111, 244/60, 100 R

[56] References Cited

U.S. PATENT DOCUMENTS

| | | | |
|---|---|---|---|
| 1,524,352 | 1/1925 | Gephart | 244/50 |
| 1,747,344 | 2/1930 | Bell | 244/50 |
| 1,960,762 | 5/1934 | Towle | 244/235 |
| 1,998,677 | 4/1935 | Laddon et al. | 244/235 |
| 2,424,523 | 7/1947 | Watter | 244/235 |
| 2,507,440 | 5/1950 | Hanson | 244/50 |
| 2,516,397 | 7/1950 | Kress et al. | 244/235 |

FOREIGN PATENT DOCUMENTS

| | | | |
|---|---|---|---|
| 292436 | 6/1932 | Italy | 244/50 |

*Primary Examiner*—Galen L. Barefoot

*Attorney, Agent, or Firm*—Nikaido, Marmelstein, Murray & Oram LLP

[57] ABSTRACT

The present invention is provided to overcome the difficulties of a conventional tail wheel-type airplane such as the remarkably inferior straight ground-run properties during a take-off run (particularly, low-speed taxiing), and the extremely difficult control during the take-off run. A mechanism of the present invention is structured such that left and right coaxial gears and main wheel gears (or connection gears) are engaged together when not stepping on rudder pedals in take-off and landing run. Under this operation, since the above gears themselves are engaged together, left and right main wheels rotate synchronously through a co-axis, and as a result, an airframe makes a straight ground-run. When stepping on the rudder pedals in taxiing, the coaxial gears and main wheel gears (or connection gears) are disengaged from each other, the left and right main wheels then rotate independently, and as a result, the airframe easily taxis (i.e., a case of turning the airframe right or left). The present invention is also applied to a tail wheel-type radio control model airplane.

8 Claims, 11 Drawing Sheets

2
5
6
4
9
7
9
7
9
11
3
10
8
1
16
17
18
15
19
14
13
20
12

2
4
5
6
16
9
7
9
7
9
10
8
11
3
1
16
17
18
15
19
14
13
20
12

2
21
4
22
16
11
10
3
1
16
17
15
18
19
14
20
13
12

2
4
21
22
11
10
3
1
16
17
15
18
19
14
20
13
12

STRAIGHT GROUND-RUN MECHANISM OF TAIL WHEEL-TYPE AIRPLANE

BACKGROUND OF THE INVENTION

1. Field of the Invention

This invention relates to a straight ground-run mechanism of a tail wheel-type airplane so as to improve the straight ground-run properties of the tail wheel-type airplane during its take-off run (particularly, low-speed taxiing).

2. Description of the Prior Art

Conventionally, a tail wheel-type airplane has been remarkably inferior in straight ground-run properties included in the properties of this tail wheel-type airplane, and it has been extremely difficult to control the tail wheel-type airplane. Sometimes, the airplane of this type has caused an accident during its take-off run.

On the other hand, a nose wheel-type airplane is relatively excellent in straight ground-run properties, and therefore, amounts to a large percentage of contemporary airplanes.

SUMMARY OF THE INVENTION

It is an object of the present invention to overcome difficulties of a conventional tail wheel-type airplane such as the remarkably inferior straight ground-run properties and the extremely difficult control during a take-off run.

A mechanism of the present invention is characterized in that left and right coaxial gears and main gears (or connection gears) are engaged with or disengaged from each other by stepping on or releasing a right or left rudder pedal, and left and right main wheels then rotate through a co-axis synchronously or independently.

When the left and right main wheels rotate synchronously, an airframe makes a straight ground-run.

The tail wheel-type airplane equipped with the present mechanism is excellent in straight ground-run properties, and besides, effective in the following.

1) The tail wheel-type airplane is stabilized even though the airplane makes touch-down while causing a sideslip.
2) The airframe equipped with a brake for the present mechanism brakes to a stop with safety without causing any ground loop or the like, since the left and right main wheels rotate synchronously and the brake works uniformly without causing any pull.
3) Further, even when applying the brake in side-slipping, the tail wheel-type airplane of the present invention attain the effects similar to the above, and maintains the high safety.
4) The tail wheel-type airplane of the present invention is more excellent than the nose wheel-type airplane in effects described in the above item 3), and also superior to the nose wheel-type airplane in straight ground-run properties.
5) The tail wheel-type airplane of the present invention is controlled more easily than the nose wheel-type airplane in take-off and landing run and in taxiing (i.e., take-off and landing are easily done), and is suitable for trainers as well.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE INVENTION

Figure 1:
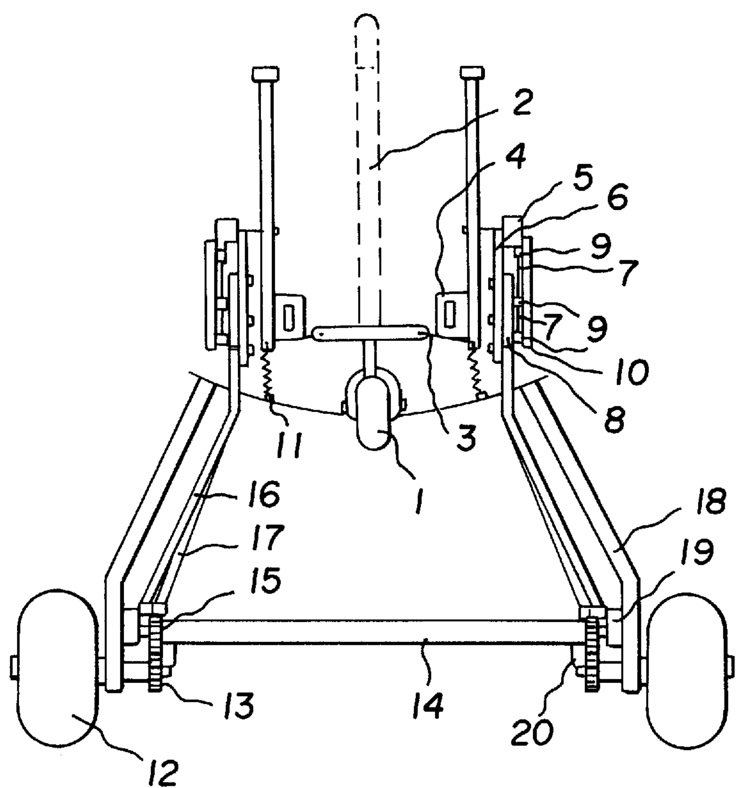
FIG. 1 is a front view of the present invention when an airframe makes a straight ground-run.

1. In the case of a real airplane:

Upper and lower actuating levers are provided in this case (i.e., the invention as defined in claim 1).

This case is shown in FIGS. 1 to 6.

The structure of the. present invention is as follows.

The front ends of pedal connection fittings 5 are mounted on left and right rudder pedals 4, and the rear ends of the pedal connection fittings are connected to the lower ends 8 of left and right actuating levers through wires 7.

The upper ends 6 of the left and right actuating levers are fitted into the longitudinal slide grooves provided on the pedal connection fittings.

The upper ends of primary and secondary connection rods 16, 17 are connected to the left and right actuating levers.

The lower ends of the primary connection rods are connected to the front ends of vertically-moved engagement/disengagement fittings 19 mounted at the rear of lower portions of main gears 18.

The lower ends of the secondary connection rods are connected to the front ends of spring-loaded crimp fittings 20.

A co-axis 14 having a circular form in cross section is mounted on the front ends of the engagement/disengagement fittings by fixing coaxial gears 15 to both ends of the co-axis.

Main wheel gears 13 are fixed to the axles of left and right main wheels 12.

The rotary axes such as the axles described above should be provided with two bearings at left and right portions to prevent the seizure around the rotary axes.

A combination of two spur gears is used for each pair of coaxial gear and main wheel gear.

The present invention is structured such that the left and right coaxial gears and main wheel gears are engaged with or disengaged from each other through the co-axis by stepping on or releasing one rudder pedal.

A description will now be given of the operation of the present invention.

1) In take-off and landing run

Figure 2:
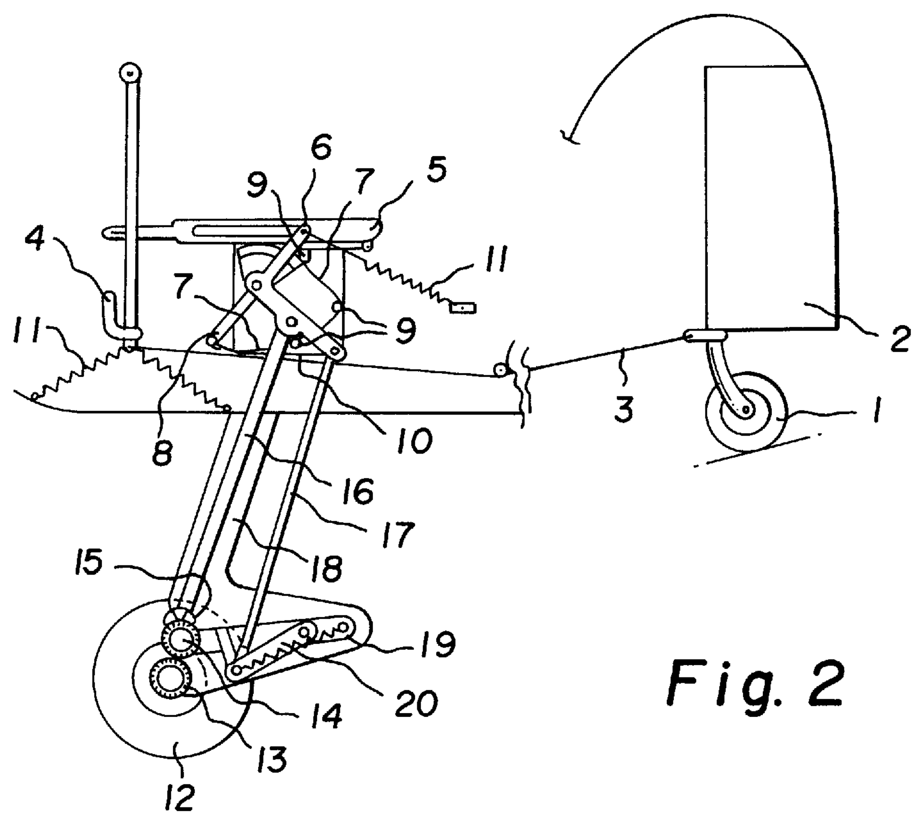
FIG. 2 is a sectional view (partially including a side view showing only a rudder portion, the rudder portion in all the following sectional views being similarly shown by a side view) of the present invention when an airframe makes a straight ground-run.
Figure 3:
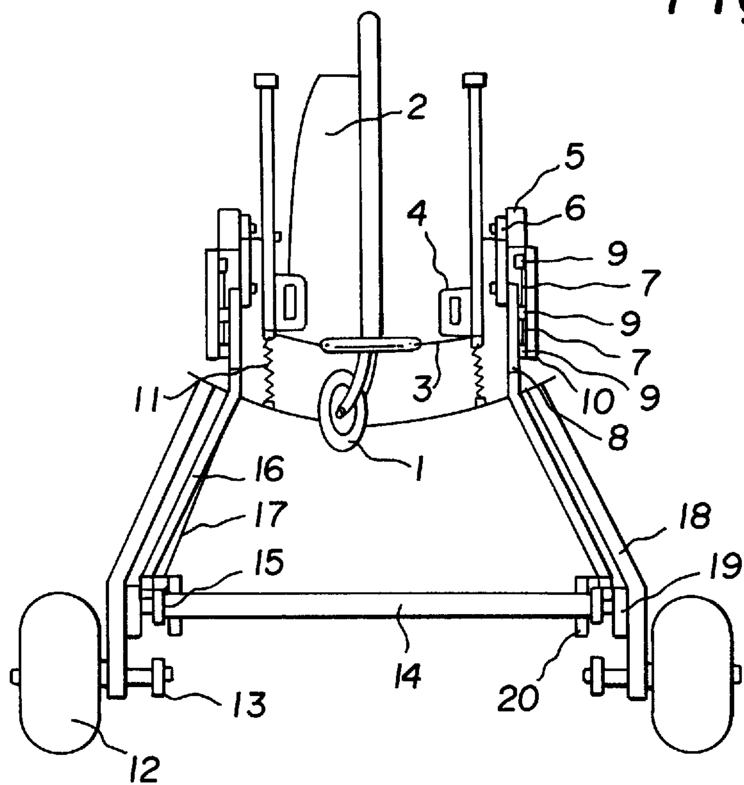
FIG. 3 is a front view of the present invention in case of stepping on a right rudder pedal in taxiing.
Figure 4:
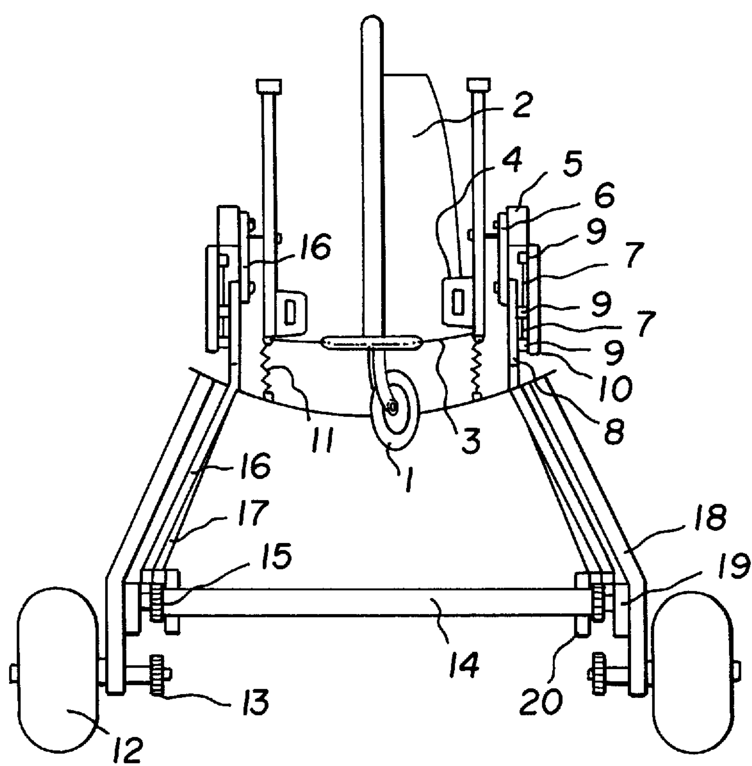
FIG. 4 is a front view of the present invention in case of stepping on a left rudder pedal in taxiing.
Figure 5:
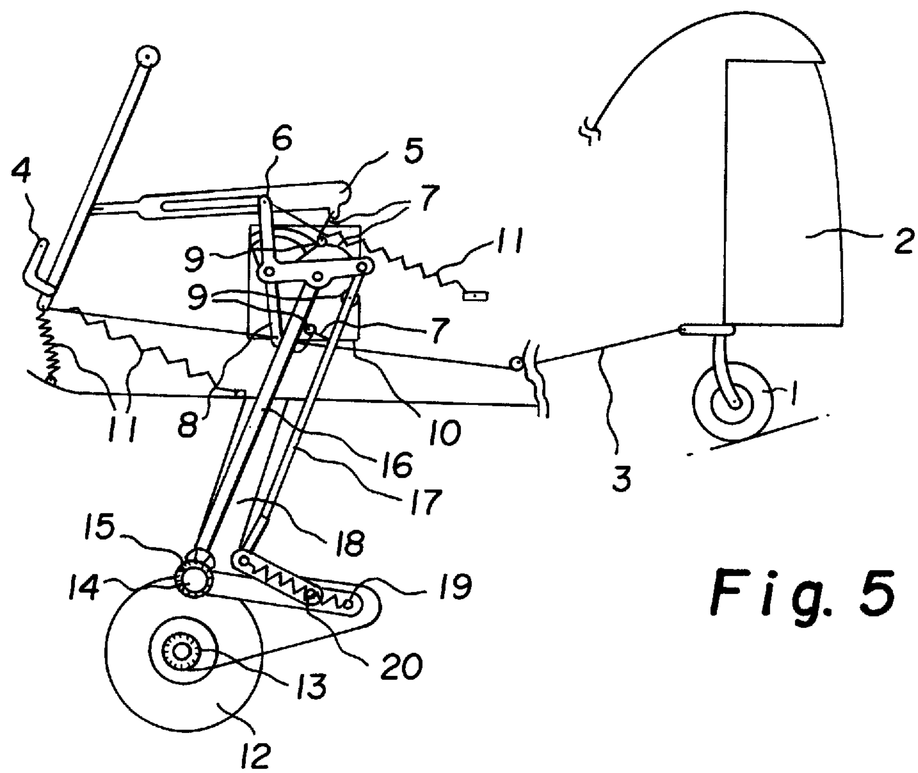
FIG. 5 is a sectional view of the present invention in case of stepping on a right rudder pedal in taxiing.
Figure 6:
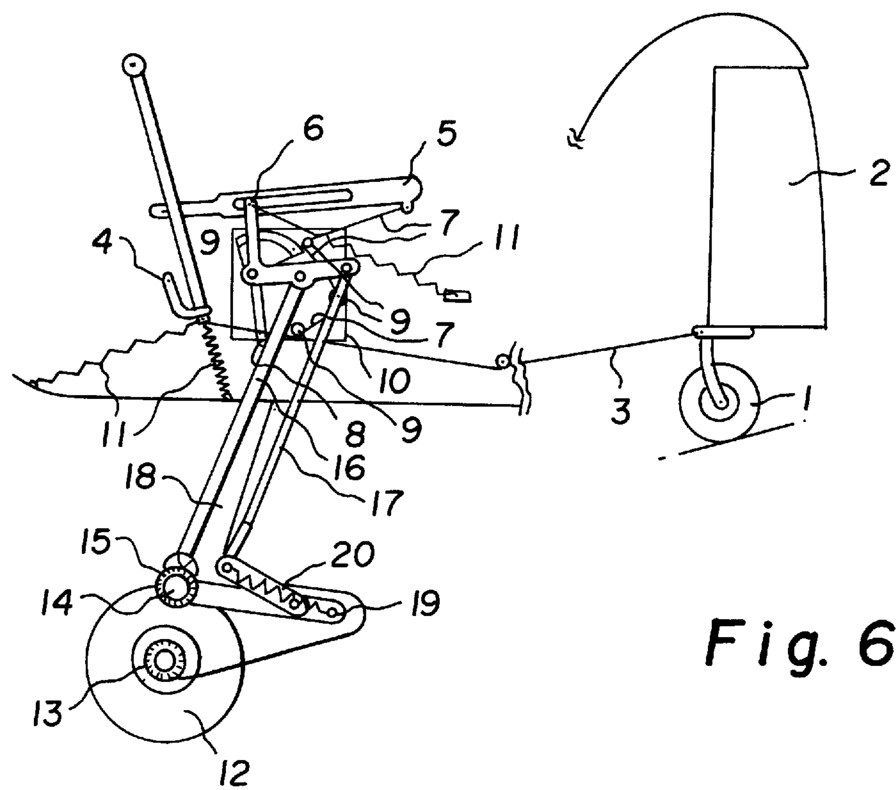
FIG. 6 is a sectional view of the present invention showing the actuating positions of a left rudder pedal and a pedal connection fitting or the like in case of stepping on the right rudder pedal in taxiing as shown in FIG. 5.

This case is shown in FIGS. 1 and 2.

In this case, it is not necessary to step on the rudder pedals.

When not stepping on the rudder pedals, the left and right coaxial gears and main wheel gears are pressedly fitted (engaged) to each other through the crimp fittings by the action of springs 11 or the like.

When both the gears are engaged together, an airframe makes a straight ground-run, since the left and right main wheels rotate synchronously through the co-axis to provide the same speed of rotation for the left and right main wheels.

2) In taxiing

This case is shown in FIGS. 3 to 6 (when turning the airframe right).

The left and right rudder pedals are operated in interlocking relation (connected) with a tail wheel 1, a rudder 2 and rudder cables 3.

When stepping on the right rudder pedal, one pedal connection fitting connected to the right rudder pedal is advanced (in this case, the wire mounted on the rear end of the pedal connection fitting is not loosened).

The upper end of the actuating lever joined to the pedal connection fitting is pulled by the pedal connection fitting, and then also advanced.

On the other hand, the left rudder pedal opposite to the right rudder pedal is pulled by the rudder cables connected to the left rudder pedal, and then reversely retreated, and the pedal connection fitting connected to the left rudder pedal is also retreated.

Under this operation, the lower end of the actuating lever is pulled by the wire mounted on the rear end of the pedal connection fitting, and then also retreated. The upper end of the actuating lever united with the lower end of the retreated actuating lever is reversely advanced.

Under a series of these operations, the upper ends of the left and right actuating levers are always advanced when stepping on the right or left rudder pedal.

The operation of stepping on the right or left rudder pedal allows the primary and secondary connection rods connected to the left and right actuating levers to be pulled upwards, and the left and right engagement/disengagement fittings are also moved upwards.

The co-axis mounted on the engagement/disengagement fittings is also moved upwards in interlocking relation with the engagement/disengagement fittings.

Under this operation, the left and right coaxial gears and main wheel gears are disengaged from each other, and as a result, the left and right main wheels rotate independently. Thus, the airframe is easily turned right or left in taxiing.

One of the advantages of the present mechanism is that the upper ends of the left and right actuating levers are always advanced by stepping on one rudder pedal.

Accordingly, it is a great convenience that the coaxial gears and the main wheel gears operated in interlocking relation with the upper ends of the left and right actuating levers are simultaneously disengaged from each other on the left and right sides.

If this mechanism is structured such that only one gear is moved to be apart from the other gear, the other gear is becomes worn unevenly to develop troubles or the like, or lead to accidents in some cases.

According to the present invention, inclusive of those which will be described later, the left and right coaxial gears and main wheel gears (or connection gears) are structured to be simultaneously disengaged from each other.

2. In the case of another real airplane:

Only upper actuating levers are provided in this case (i.e., the invention as defined in claim 2)

This case is shown in FIGS. 7 to 12.

The structure of the present invention is as follows.

A pedal joint fitting 21 arranged in front of the left and right rudder pedals is joined to the left and right rudder pedals. When stepping on one rudder pedal, the pedal joint fitting 21 is pushed by the stepped pedal and then moved only forward.

The left and right rear ends of the pedal joint fitting are connected to the upper ends of the left and right actuating levers 22, and the upper ends of the primary and secondary connection rods are connected to the actuating levers 22.

Thus, a straight ground-run mechanism of a tail wheel-type airplane similar to that in the invention as defined in claim 1 (including the upper and lower actuating levers) is applied to the structure of a lower portion in this case.

A description will now be given of the operation of the present invention.

1) In take-off and landing run

Figure 7:
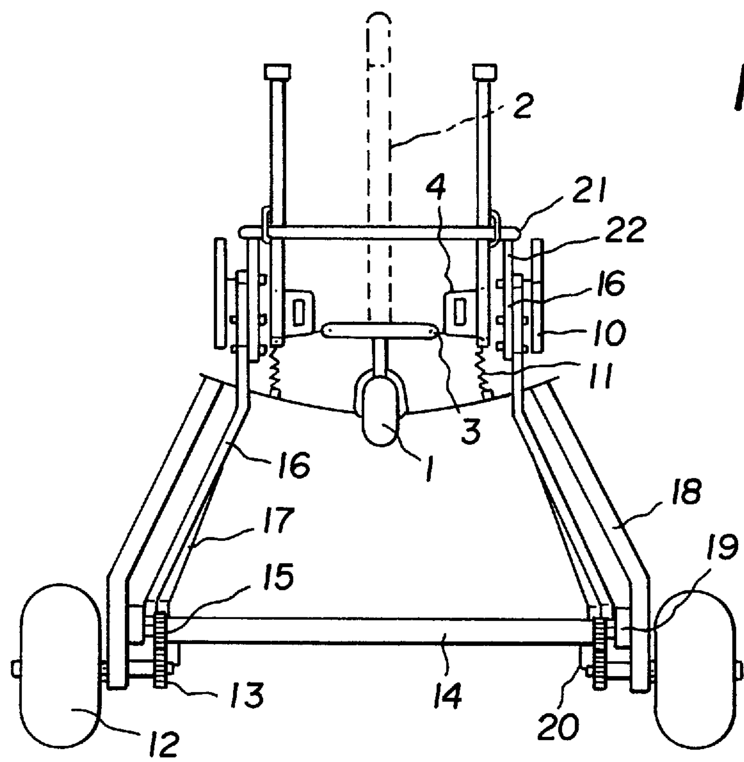
FIG. 7 is a front view of the present invention correspondingly applied to the case of FIG. 1.
Figure 8:
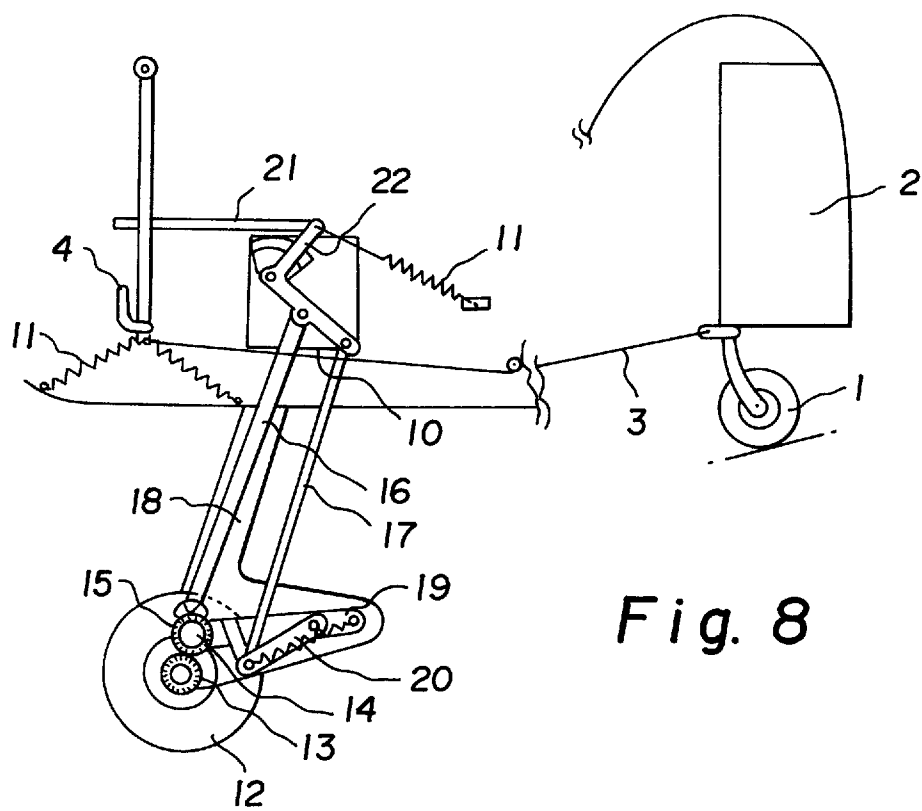
FIG. 8 is a sectional view of the present invention correspondingly applied to the case of FIG. 2.
Figure 9:
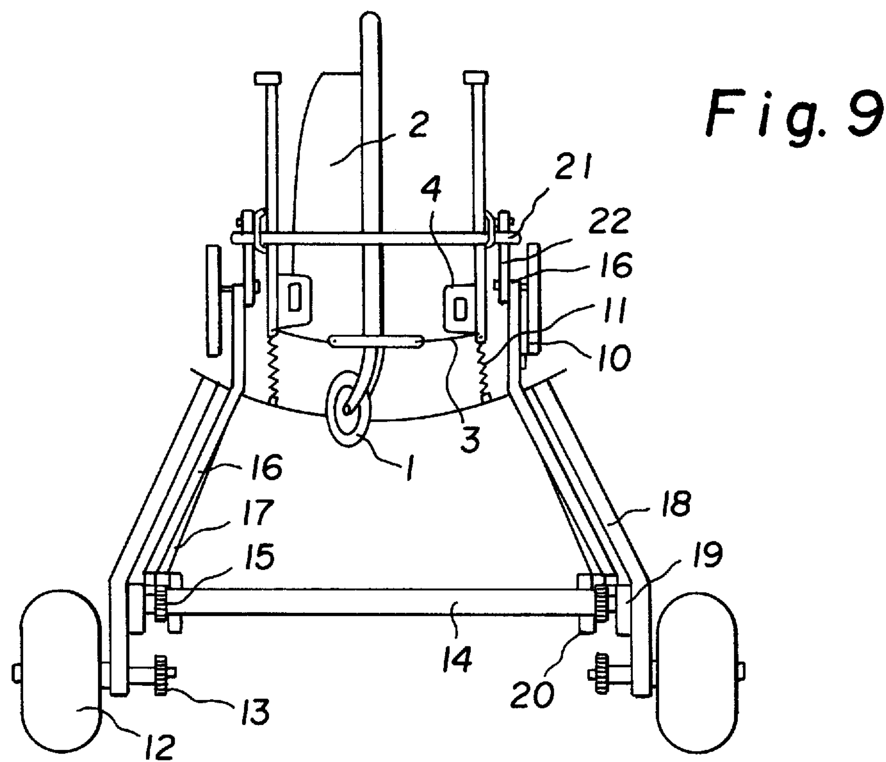
FIG. 9 is a front view of the present invention correspondingly applied to the case of FIG. 3.
Figure 10:
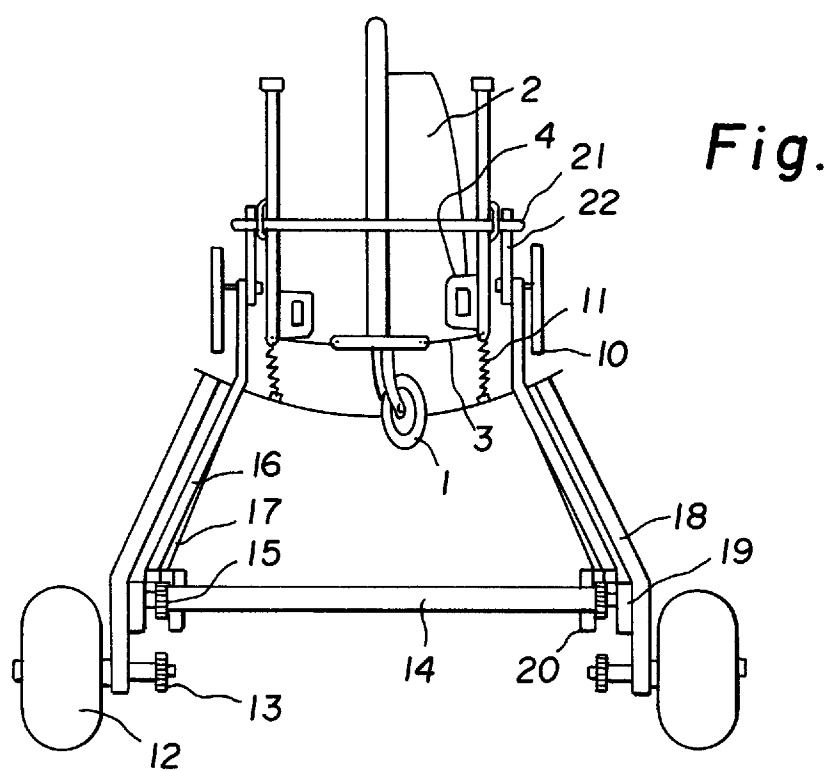
FIG. 10 is a front view of the present invention correspondingly applied to the case of FIG. 4.
Figure 11:
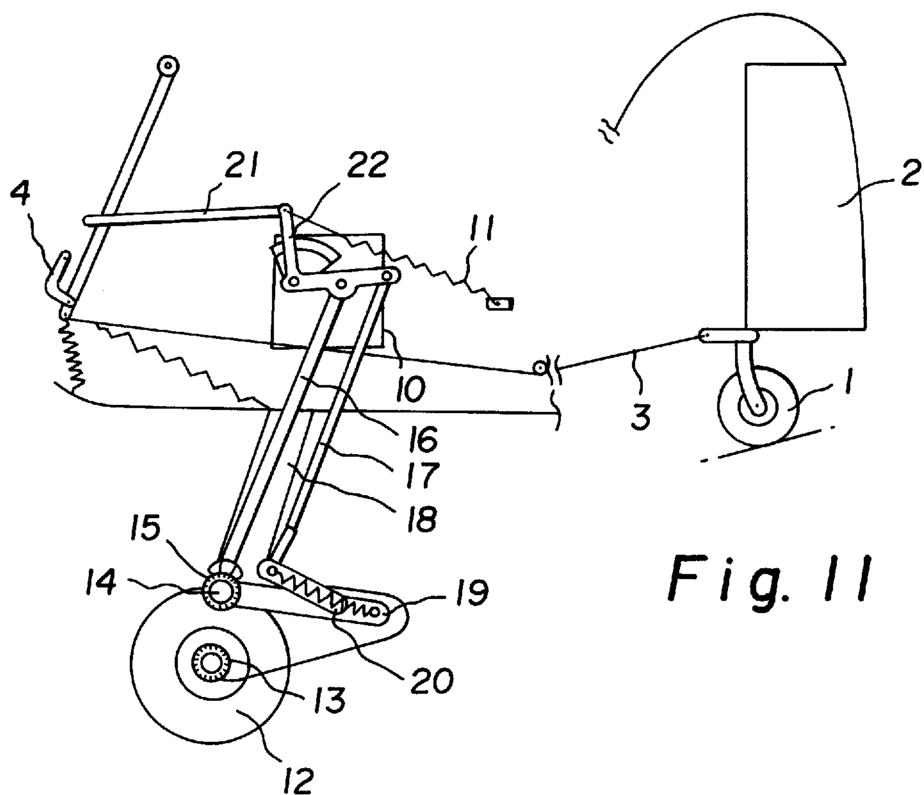
FIG. 11 is a sectional view of the present invention correspondingly applied to the case of FIG. 5.
Figure 12:
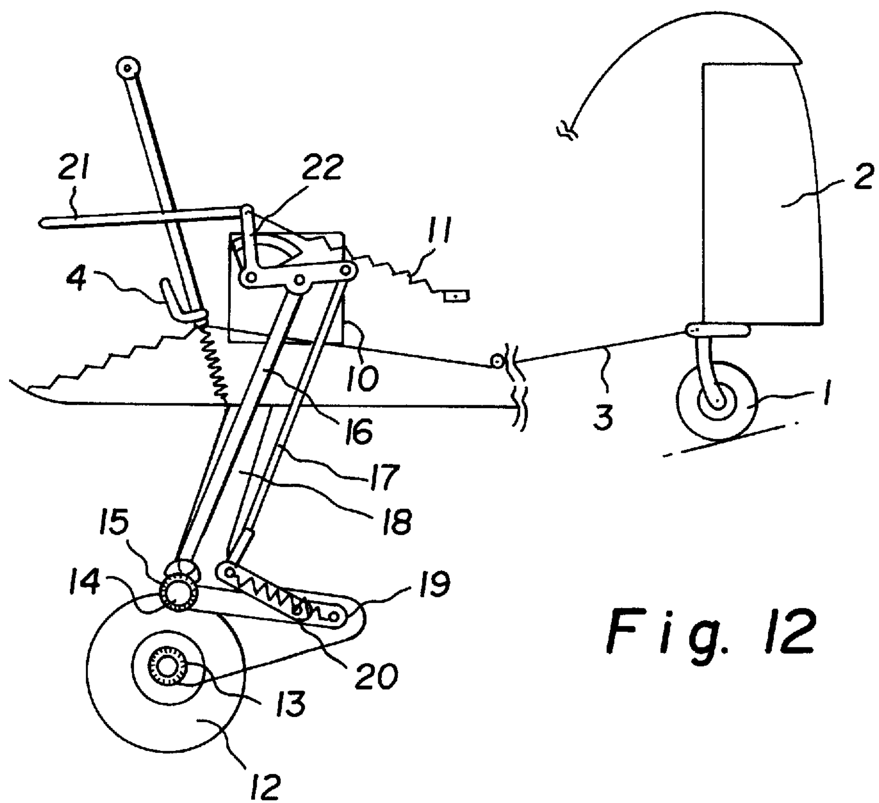
FIG. 12 is a sectional view of the present invention correspondingly applied to the case of FIG. 6.

This case is shown in FIGS. 7 and 8.

In this case, it is not necessary to step on the rudder pedals.

When not stepping on the rudder pedals, the left and right coaxial gears and main wheel gears are engaged together by the action of the springs or the like, and the left and right main wheels then rotate synchronously through the co-axis. As a result, the airframe makes a straight ground-run.

2) In taxiing

This case is shown in FIGS. 9 to 12 (when turning the airframe right).

When stepping on the right rudder pedal, the pedal joint fitting operated in interlocking relation with the right rudder pedal is advanced, and the upper ends of the left and right actuating levers connected to the pedal joint fitting are also advanced.

Then, the primary and secondary connection rods connected to the actuating levers are pulled upwards.

Although the left rudder pedal opposite to the right rudder pedal is pulled by the rudder cables and then retreated, only the left rudder pedal slides rearward, and the pedal joint fitting connected to the left and right rudder pedals is only advanced as it is and remains still.

Accordingly, the upper end of the left actuating lever 22 remains positioned ahead, and the primary and secondary connection rods remain pulled upwards.

According to this mechanism, similarly to the invention as defined in claim 1, the upper ends of the left and right actuating levers are always advanced when stepping on one rudder pedal.

The operation subsequent to that described above is similar to that of the invention as defined in claim 1. The left and right coaxial gears and main wheel gears are disengaged from each other, and as a result, taxiing is easily done.

3. In the case of a further real airplane:

No actuating lever is provided in this case (i.e., the invention as defined in claim 3).

Figure 13:
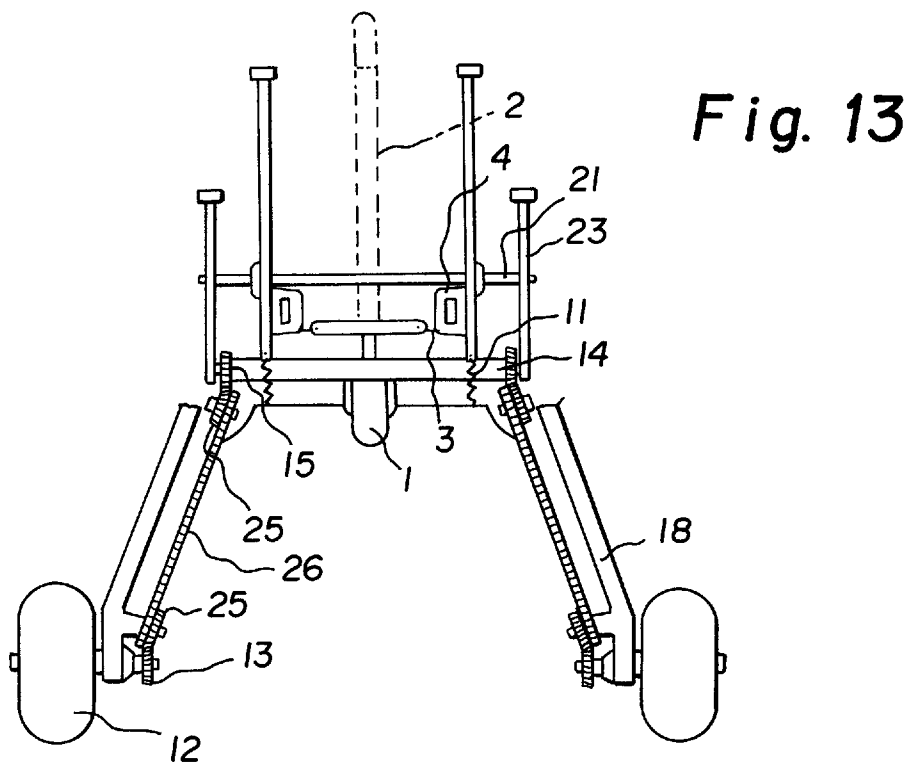
FIG. 13 is a front view showing the application of the present invention in case of mounting a co-axis on the interior of an airplane.
Figure 14:
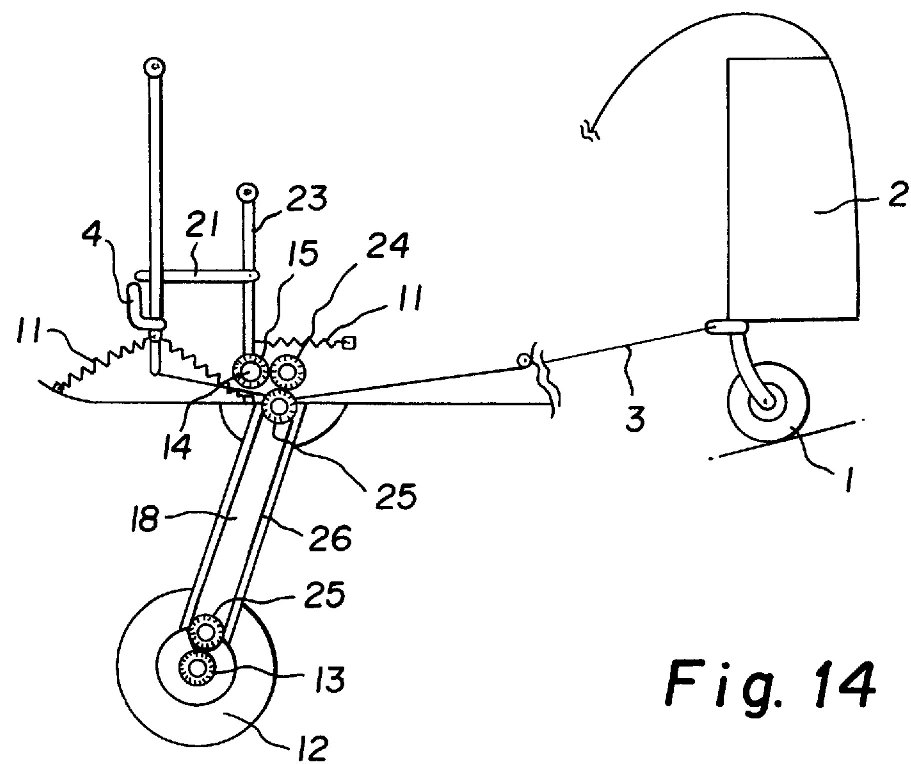
FIG. 14 is a sectional view showing the application of the present invention shown in FIG. 13.

This case is shown in FIGS. 13 and 14.

The structure of the present invention is as follows.

The pedal joint fitting is joined to the left and right rudder pedals, and the rear end of the pedal joint fitting is directly connected to engagement/ disengagement rods 23 operated forward and rearward by fixing the coaxial gears to both ends of the co-axis.

The main wheel gears are fixed to the axles of the left and right main wheels, and chain connection gears 25 connected to the main wheel gears are mounted on the lower portions of the main gears.

The chain connection gears and another chain connection gears mounted on the lower portions in the airframe are connected together through chain belts 26 or the like.

Connection gears 24 connected to the chain connection gears mounted on the lower portions in the airframe are mounted at the rear of the coaxial gears mounted on the lower portions in the airframe.

According to this structure, the left and right engagement/disengagement rods connected to the rudder pedals are operated forward and rearward to engage or disengage the left and right coaxial gears and connection gears with or from each other.

The left and right rudder pedals and the pedal joint fitting are structured and operated similarly to those in the invention as defined in claim 2 (including only the upper actuating levers).

According to this structure, when the main wheels rotate, the left and right connection gears are also rotated at all times in interlocking relation (through the chains or the like) with the main wheels.

In the operation of the present invention, the left and right coaxial gears and connection gears are engaged with or disengaged from each other by stepping on or releasing one rudder pedal, and the left and right main wheels then rotate through the co-axis synchronously or independently.

FIGS. 13 and 14 show the condition of the present mechanism in straight ground-run.

Further, as the application of the present invention, the present mechanism is equipped for a low-wing monoplane having fixed-type landing gears.

A description will now be given of methods of controlling a tail wheel-type airplane equipped with the present mechanism and a general-type airplane in take-off and landing run and in taxiing.

Since there is no particular difference between the tail wheel-type airplane and the general-type airplane in control method, the tail wheel-type airplane is conveniently controlled without leading to a confusion.

4. In the case of a radio control airplane (i.e., the invention as defined in claim 4):

This case is shown in FIGS. 15 to 18.

The structure of the.present invention is as follows.

A rudder servo motor 27 is mounted on the center line (as viewed from the upper surface) of the airframe.

Actuating rods 29 are connected to the left and right sides of a servo horn 28 mounted on the rudder servo motor.

Actuating tubes 30 are provided, which are pushed by the actuating rods and then advanced and have grooves allowing the actuating rods to slide forward and rearward.

The front ends of the actuating tubes are connected to the upper ends of actuating-tube levers 31, and the rear ends of the actuating-tube levers are connected to the upper ends of actuating plates 33 through upper interlock rods 32.

The left and right rear ends of the actuating plates are connected to the left and right engagement/disengagement rods 35 through lower interlock rods. The engagement/disengagement rods 35 are operated forward and rearward by fixing the coaxial gears to both ends of the co-axis.

Figure 15:
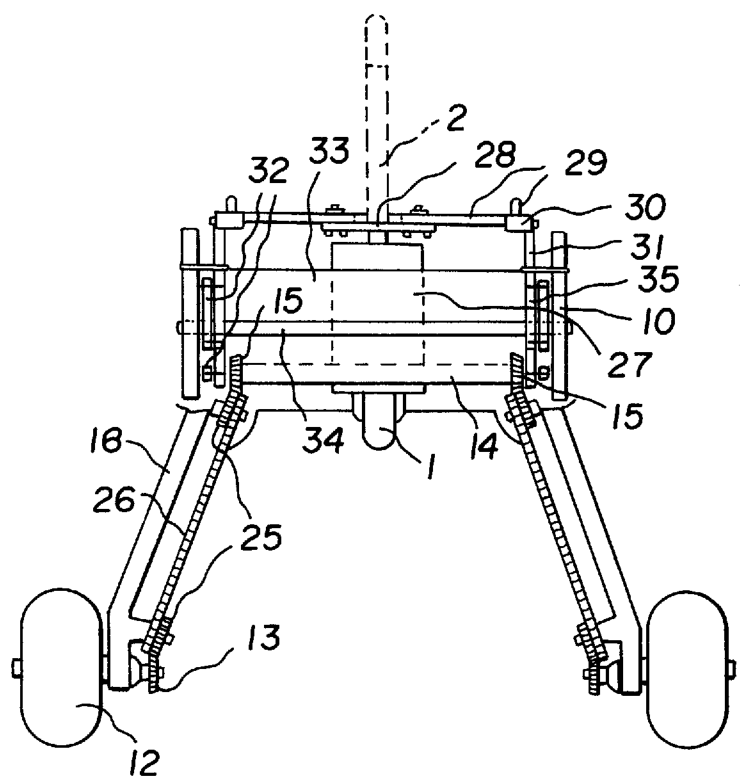
FIG. 15 is a front view showing the application of the present invention to a tail wheel-type radio control model airplane (hereinafter will be referred to as a radio control airplane) in straight ground-run.

In the positional relationship between the engagement/disengagement rods and the actuating-tube levers as viewed from the front, the actuating-tube levers are positioned right behind the engagement/disengagement rods as shown in FIG. 15.

The main wheel gears are fixed to the axles of the left and right main wheels, and the main wheel gears and the connection gears mounted on the lower portions in the airframe are connected together through two, i.e., upper and lower chain connection gears and chains or the like.

The above-mentioned structure is similar to that of the invention as defined in claim 3 (including no actuating lever).

A description will now be given of the operation of the present mechanism.

1) In take-off and landing run

Figure 16:
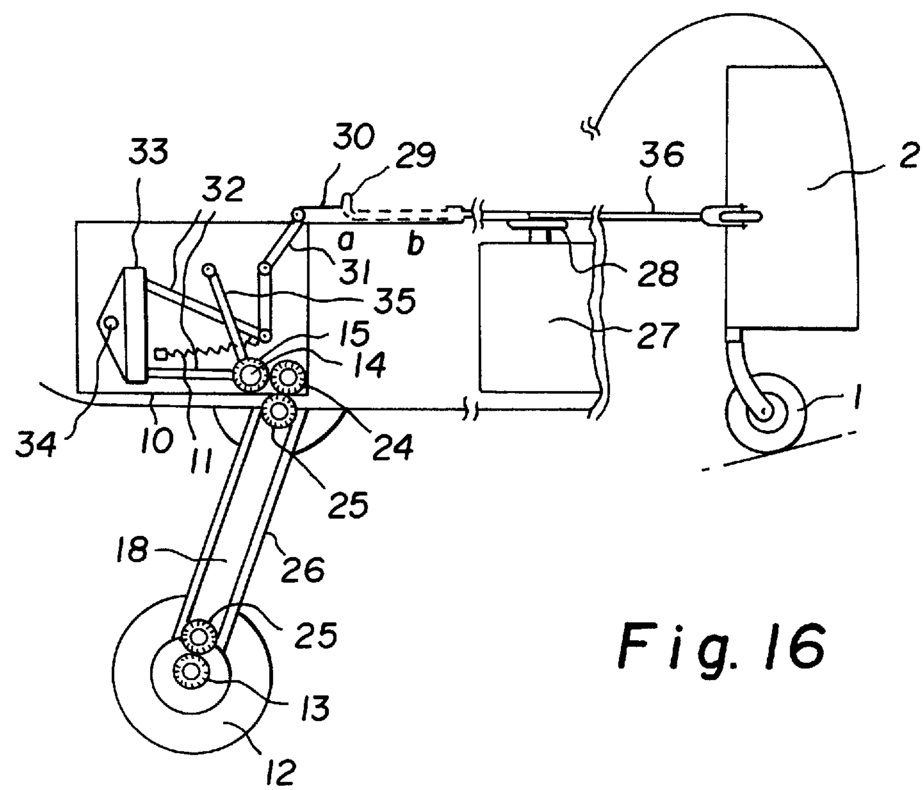
FIG. 16 is a sectional view showing the application of the present invention in straight ground-run shown in FIG. 15.

This case is shown in FIGS. 15 and 16.

In this case, unless the rudder of a transmitter is operated, the left and right coaxial gears and connection gears are always engaged together by the action of the springs or the like, and as a result, the airframe makes a straight ground-run.

2) In taxiing

Figure 17:
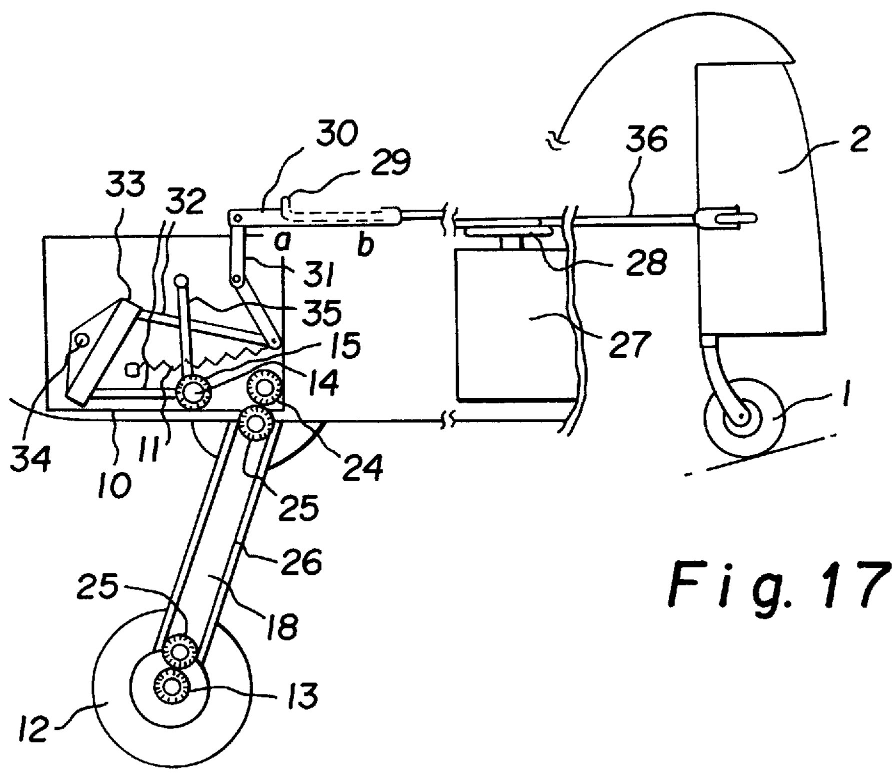
FIG. 17 is a sectional view showing the right side of a radio control airplane when a rudder is actuated to the right in taxiing.
Figure 18:
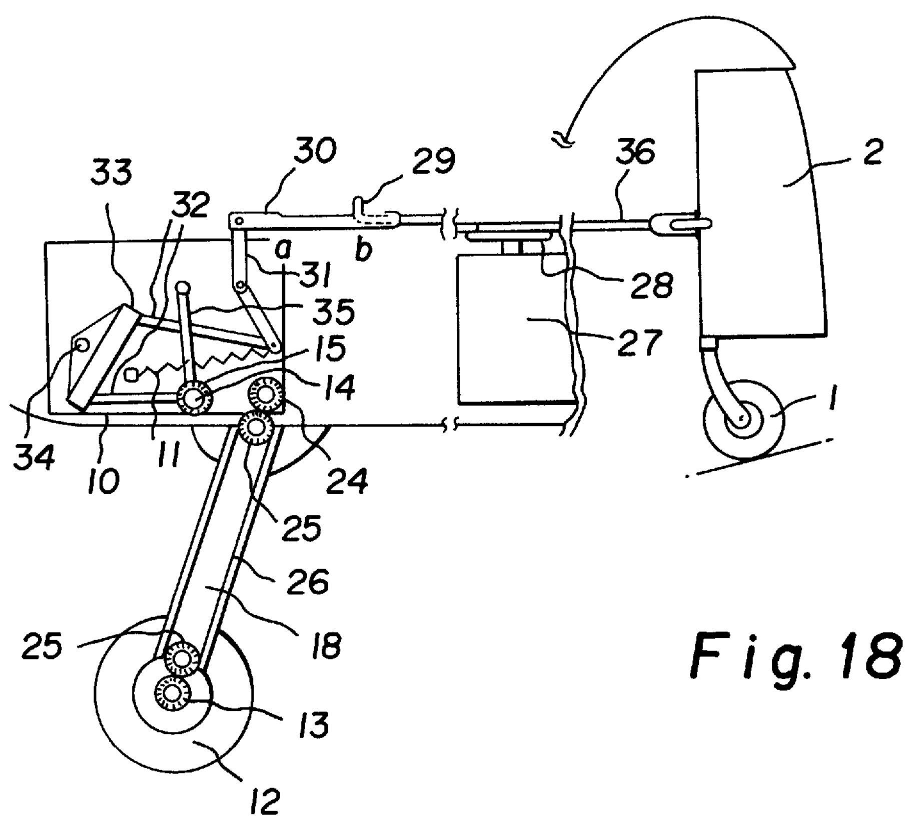
FIG. 18 is a sectional view showing the left side of the radio control airplane in case where the front end of an actuating rod is retreated up to a position denoted by b in FIG. 18, when the rudder is actuated to the right as shown in FIG. 17.

This case is shown in FIGS. 17 and 18.

When turning the airframe right, the rudder of the transmitter is controlled to right, and as a result, the rudder servo motor is actuated.

Under this operation, the actuating rod mounted on the right side of the servo horn connected to the rudder servo motor is advanced to push the actuating tube ahead, and the actuating-tube lever connected to the pushed actuating tube is then also advanced.

Under this operation, the upper interlock rod connected to the actuating-tube lever is retreated, and the lower end of the actuating plate is advanced.

Under this operation, the left and right lower interlock rods connected to the left and right rear ends of the actuating plate are advanced, and the left and right engagement/disengagement rods operated in interlock relation with the left and right lower interlock rods are then advanced.

Under this operation, the coaxial gears mounted on the engagement/disengagement rods are advanced and then disengaged from the left and right connection gears.

The above operation is shown in FIG. 17.

On the other hand, the front end of the actuating rod mounted on the left side of the servo horn connected to the rudder servo motor is retreated from a position a to a position b (included in the slide groove) shown in FIG. 18 in response to the operation of the rudder servo motor.

It is necessary to set the distance between the positions a and b in FIG. 18 to be twice or more as long as the distance required for the actuating rod advanced by fully actuating the rudder servo motor.

Under this operation, only the left actuating rod is retreated, while the actuating tube joined to the left actuating rod is only advanced as it is and remains still, since this actuating tube is operated in interlock relation with the upper and lower interlock rods and the actuating plate or the like.

The above operation is shown in FIG. 18.

Accordingly, when the rudder is controlled, the left and right coaxial gears and connection gears are disengaged from each other under a series of these operations, and as a result, taxiing is easily done.

5. In the case of an airplane equipped with a buffer mechanism for the present invention:

This case is shown in FIGS. 19 to 22.

It is most suitable to mount the present buffer mechanism on the main gears structurally.

Figure 19:
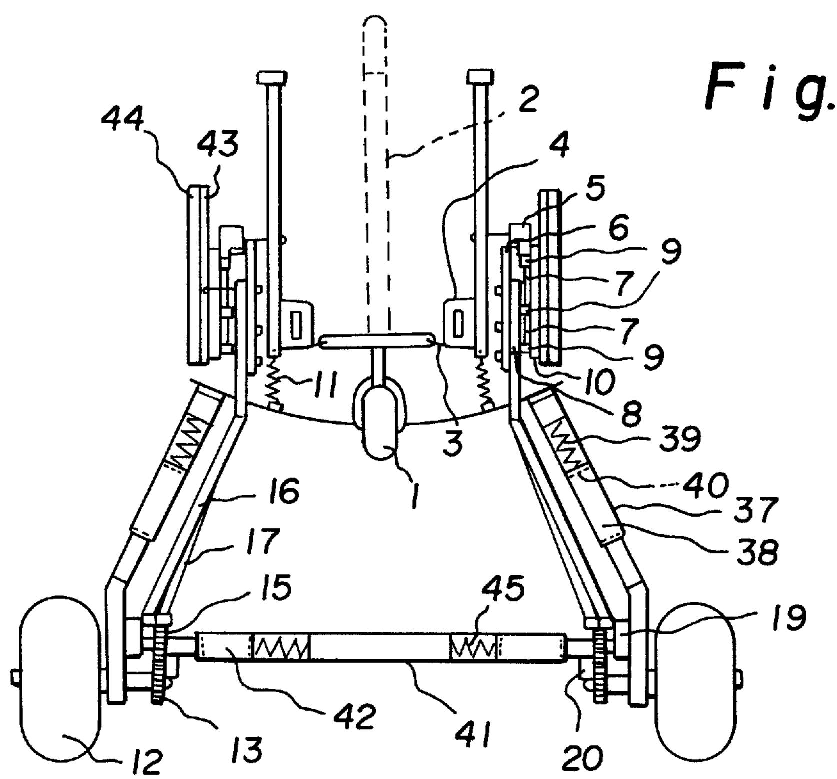
FIG. 19 is a front view showing an airframe equipped with a buffer mechanism for the present invention (having a co-axis mounted on a lower portion of the airframe)
Figure 20:
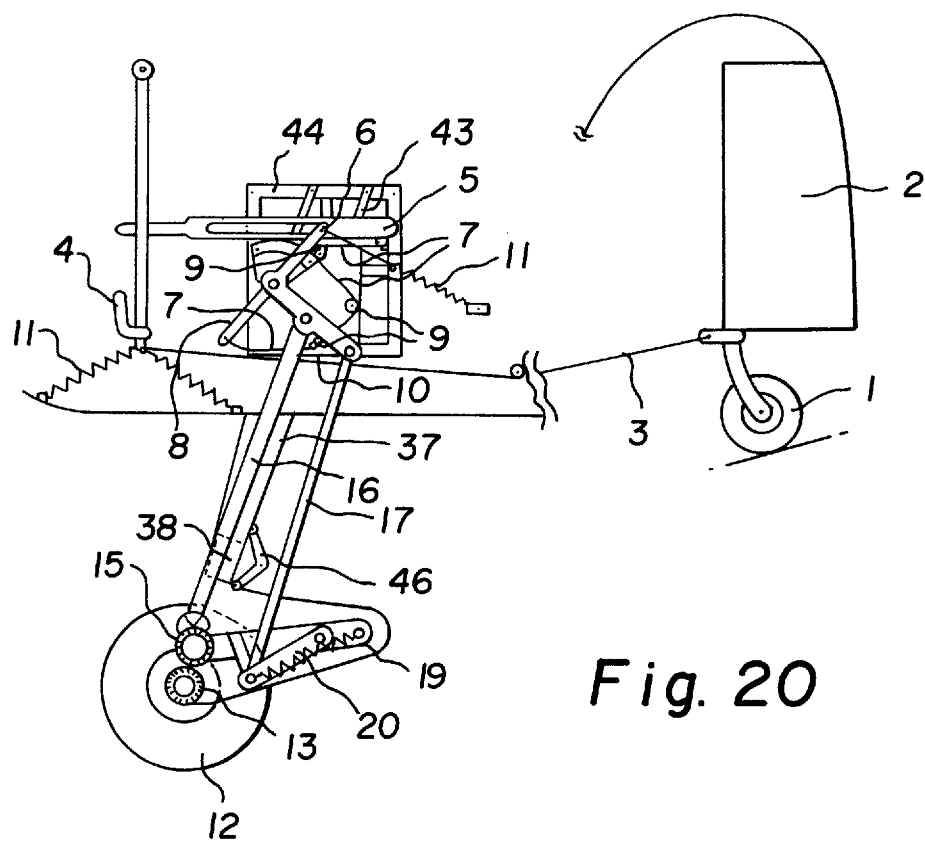
FIG. 20 is a sectional view showing the airframe equipped with the buffer mechanism for the present invention (shown in FIG. 19)

The buffer mechanism shown in FIGS. 19 and 20 is applied to the present invention, in which the co-axis is mounted on the lower portion of the airframe.

According to the mechanism, when outer and inner tubes 37, 38 of the main gears are moved upwards and downwards on impact against the ground surface, the primary connection rods connected to the outer and inner tubes of the main gears are also moved upwards and downwards through the engagement/disengagement fittings.

Under this operation, fitting mount plates connected to the primary connection rods or the like are moved obliquely upwards and downwards through slide rails 43, which are mounted on slide plates 44, in interlock relation with the main gears.

The pedal connection fittings and the rudder pedals connected to the upper ends of the actuating levers are hardly influenced by the above operation.

A coaxial outer tube 41 and coaxial inner tubes 42 respectively having a circular form in cross section are structured so as to be extended or contracted leftward and rightward in interlocking relation with cushions of the main gears, while causing no idling of both the coaxial tubes themselves.

In the above structure, the coaxial outer tube and the coaxial inner tubes respectively have the extended or contracted joint surfaces (two, i.e., left and right portions) provided with crests and troughs joined to each other and arranged to be slidable leftward and, rightward.

Alternately, the joint portions of both the coaxial tubes are formed to have a polygonal shape in cross section.

Incidentally, the main gears and the coaxial tubes in section are shown in FIG. 19.

Figure 21:
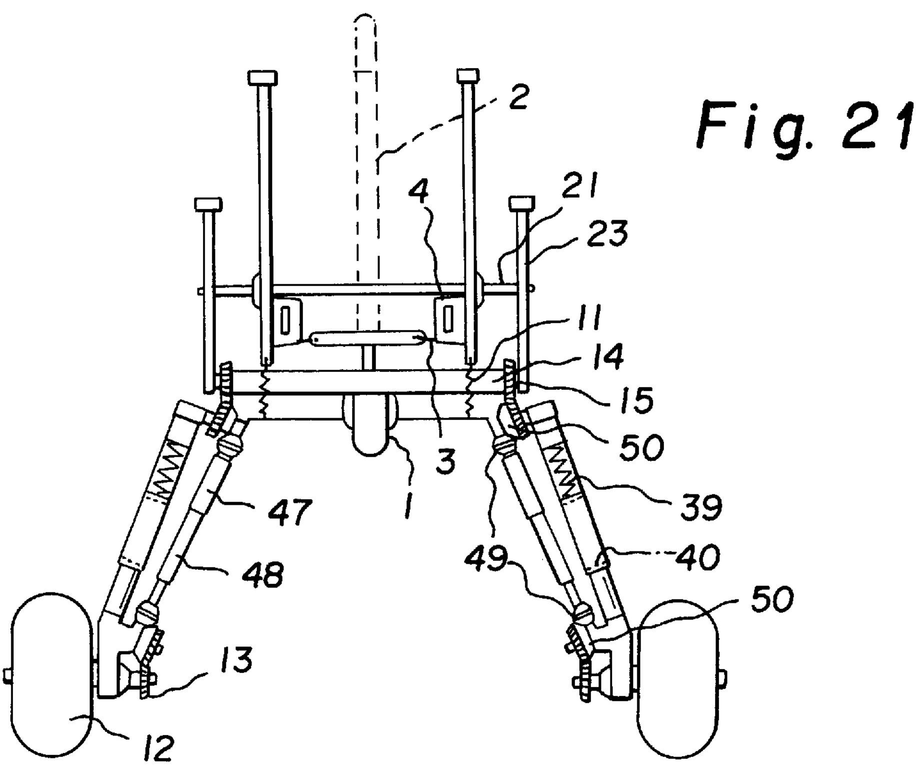
FIG. 21 is a front view showing an airframe equipped with a buffer mechanism for the present invention (having a co-axis mounted on the interior of the airframe)
Figure 22:
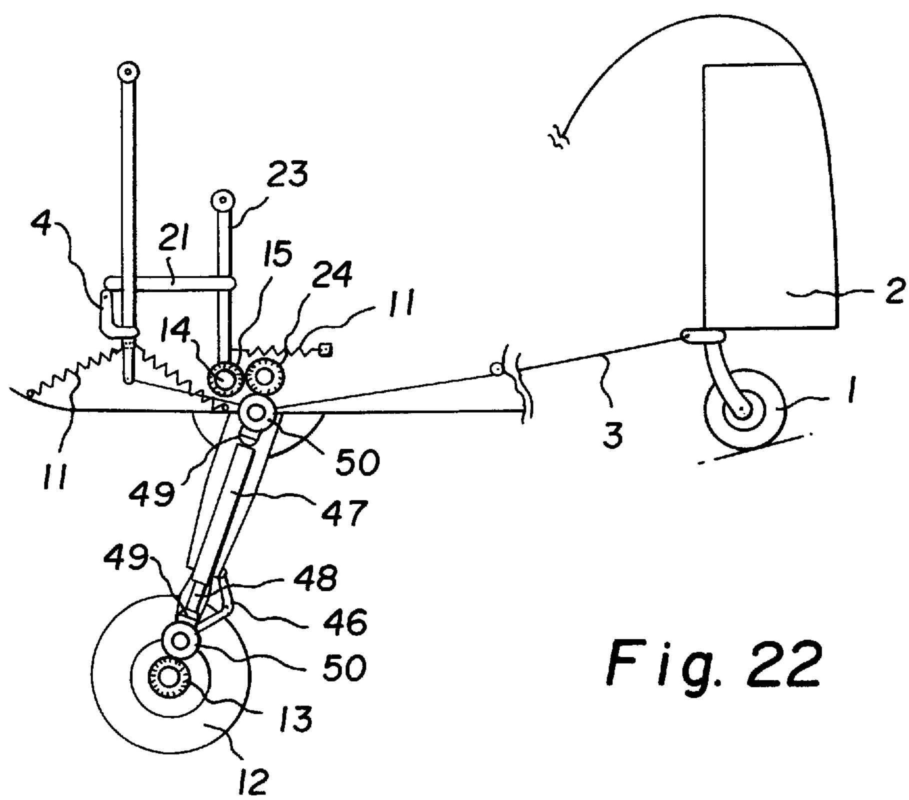
FIG. 22 is a sectional view showing the airframe equipped with the buffer mechanism for the present invention (shown in FIG. 21).

A buffer mechanism shown in FIGS. 21 and 22 is applied to the present invention, in which the co-axis is mounted on the interior of the airframe.

In this mechanism, rotary-rod outer tubes 47 and rotary-rod inner tubes 48 respectively having a circular form in cross section are provided on the left and right sides of the airframe.

Each universal joint 49 is connected to the upper and lower ends of both the rotary rods.

Each set of gears 50 is connected to the upper and lower universal joints.

The upper and lower sets of gears are composed of bevel gears and chain connection gears included in the present invention as defined in claim 3 (including no actuating lever).

The upper set of gears is connected to the connection gears in the airframe, and the lower set of gears is connected to the main wheel gears.

The rotary-rod outer and inner tubes are structured so as to be extended or contracted upwards and downwards in interlocking relation with the cushions of the main gears, while causing no idling of both the rotary rods.

Further, when the main wheels rotate, the connection gears are also rotated at all times through the rotary rods.

The structure of both the rotary rods which are extended or contracted without idling is in correspondence with the structure of the joint portions of the coaxial outer and inner tubes which are extended or contracted leftward and rightward without idling as described in the foregoing.

Incidentally, the main gears and both the rotary rods in section are shown in FIG. 21.

Since the left and right main wheels are suspended independently of each other, two kinds of buffer mechanisms described above are provided as an extremely rational buffer mechanism.

What is claimed is:

1. A straight ground-run mechanism of a tail wheel-type airplane, comprising:

left and right rudder pedals;

left and right main wheels, each wheel having an axle;

main wheel gears on the axles of left and right main wheels and rotatable with said main wheels;

a co-axis rotatably mounted in parallel with said wheel axles, said co-axis having opposite ends and coaxial gears fixedly mounted on said opposite ends: and means for normally engaging said coaxial gears and said main wheel gears and for disengaging said coaxial gears and said main wheel gears whenever one of said left and right rudder pedals is actuated, said means comprising:

pedal connection fittings having the front ends connected to said left and right rudder pedals;

left and right actuating levers, each composed of upper and lower actuating levers and having lower ends connected to rear ends of said pedal connection fittings through wires, and upper ends joined to grooves provided on said pedal connection fittings;

primary connection rods having upper ends mounted on said left and right actuating levers; and engagement/disengagement fittings having front ends connected to lower ends of said primary connection rods;

said co-axis being mounted on the front end portions of said engagement/disengagement fittings;

whereby said coaxial gears and main wheel gears are engaged with or disengaged from each other.

2. A straight ground-run mechanism of a tail wheel-type airplane according to claim 1, wherein said means further comprises a pedal joint fitting joined to said left and right rudder pedals, wherein left and right rear ends of said pedal joint fitting are connected to the upper ends of said left and right actuating levers.

3. A straight ground run mechanism of a tail wheel-type airplane having an air frame, comprising:

left and right rudder pedals;

left and right main wheels, each wheel having an axle;

main wheel gears on the axles of left and right main wheels and rotatable with said main wheels;

a co-axis rotatably mounted in parallel with said wheel axles in said airframe, said co-axis having opposite ends and coaxial gears fixedly mounted on said opposite ends; and means for normally interconnecting said coaxial gears and said main wheel gears and for disconnecting connection between said coaxial gears and said main wheel gears whenever one of said left and right rudder pedals is actuated, said means comprising:

a pedal joint fitting joined to said left and right rudder pedals;

left and right engagement/disengagement rods connected to left and right rear ends of said pedal joint fitting and movably mounting said co-axis;

connection gears provided in the airframe and engageable by said coaxial gears; and means connecting said main wheel gears to said connection gears;

wherein said coaxial gears and connection gears are engaged with or disengaged from each other by operation of said left and right engagement/disengagement rods.

4. A straight ground-run mechanism of a tail wheel-type airplane according to claim 3, wherein said means connecting said main wheel gears to said connection gears comprises chains.

5. A straight ground-run mechanism of a tail wheel-type airplane according to claim 3, wherein said means connecting said main wheel gears to said connection gears comprises an upper set of gears engaged with said connection gears, a lower set of gears engaged with said main wheel gears, rotary rods extending between said upper set of gears and said lower set of gears, and universal joints connecting said rotary rods to the respective members of upper set of gears and said lower set of gears.

6. A straight ground-run mechanism of a tail wheel-type airplane having an airframe, comprising:

a servo horn;

left and right main wheels, each wheel having an axle;

main wheel gears on the axles of left and right main wheels and rotatable with said main wheels;

a co-axis rotatably mounted in parallel with said wheel axles in said airframe, said co-axis having opposite ends and coaxial gears fixedly mounted on said opposite ends; and means for normally interconnecting said coaxial gears and said main wheel gears and for disconnecting connection between said coaxial gears and said main wheel gears whenever said servo horn is actuated, said means comprising:

actuating rods connected to left and right sides of the servo horn;

actuating tubes joined to said actuating rods;

actuating-tube levers having upper ends connected to front ends of said actuating tubes;

an actuating plate having left and right upper ends connected to rear ends of said actuating tube levers through upper interlock rods;

left and right engagement/disengagement rods connected to left and right rear ends of said actuating plate through lower interlock rods and movably mounting said co-axis;

connection gears provided in the airframe and engageable by said coaxial gears; and means connecting said main wheel gears to said connection gears;

wherein said coaxial gears and connection gears are engaged with or disengaged from each other by operation of said left and right engagement/disengagement rods.

7. A straight ground-run mechanism of a tail wheel-type airplane according to claim 6, wherein said means connecting said main wheel gears to said connection gears comprises chains.

8. A straight ground-run mechanism of a tail wheel-type airplane according to claim 6, wherein said means connecting said main wheel gears to said connection gears comprises an upper set of gears engaged with said connection gears, a lower set of gears engaged with said main wheel gears, rotary rods extending between said upper set of gears and said lower set of gears, and universal joints connecting said rotary rods to the respective members of upper set of gears and said lower set of gears.

* * * * *